United States Patent
Biederman et al.

(10) Patent No.: US 9,361,047 B2
(45) Date of Patent: Jun. 7, 2016

(54) SYNCHRONIZATION OF A DISPERSED RAID GROUP

(71) Applicant: VIOLIN MEMORY INC., Mountain View, CA (US)

(72) Inventors: Daniel C. Biederman, San Jose, CA (US); Jon C. R. Bennett, Sudbury, MA (US)

(73) Assignee: VIOLIN MEMORY INC., Santa Clara, CA (US)

( * ) Notice: Subject to any disclaimer, the term of this patent is extended or adjusted under 35 U.S.C. 154(b) by 266 days.

(21) Appl. No.: 13/933,310

(22) Filed: Jul. 2, 2013

(65) Prior Publication Data

US 2014/0013048 A1    Jan. 9, 2014

Related U.S. Application Data

(60) Provisional application No. 61/667,660, filed on Jul. 3, 2012.

(51) Int. Cl.
   *G06F 3/06*      (2006.01)
   *G06F 11/10*     (2006.01)

(52) U.S. Cl.
   CPC .......... *G06F 3/0689* (2013.01); *G06F 11/108* (2013.01)

(58) Field of Classification Search
   None
   See application file for complete search history.

(56) References Cited

U.S. PATENT DOCUMENTS

| | | |
|---|---|---|
| 2010/0205355 A1 | 8/2010 | Moskalik |
| 2011/0126045 A1 | 5/2011 | Bennett |
| 2011/0258382 A1* | 10/2011 | Cho ................. G06F 11/108 711/114 |
| 2012/0096309 A1 | 4/2012 | Kumar et al. |
| 2012/0120730 A1 | 5/2012 | Kang et al. |
| 2013/0019062 A1* | 1/2013 | Bennett .............. G06F 3/0614 711/114 |
| 2013/0262739 A1* | 10/2013 | Bennett .............. G06F 3/0689 711/102 |

FOREIGN PATENT DOCUMENTS

| | | |
|---|---|---|
| KR | 10-2011-0117025 A | 10/2011 |
| KR | 10-2012-0052030 A | 5/2012 |
| WO | WO 2008/121306 A2 | 10/2008 |
| WO | WO 2011/044515 A2 | 4/2011 |

OTHER PUBLICATIONS

International Search Report and Written Opinion of the International Searching Authority for International Application No. PCT/US2013/049067, dated Jan. 15, 2015, 7 pgs.

(Continued)

*Primary Examiner* — Gary Portka
(74) *Attorney, Agent, or Firm* — Brinks Gilson & Lione

(57) ABSTRACT

In a memory system where memory units may be separated from each other so as to operate substantially independently, the coordination of related memory operations between such units may be by synchronization of an epoch of time and the start of an epoch of time with a common synchronization source. The source may be distributed directly to each of the memory modules of a memory unit, or through an intermediate synchronization circuit of a memory unit that is common to the modules. Where the data is stored as a RAID stripe on a plurality of synchronized modules, the read and write or erase operations performed by the modules may be arranged such that the write operations or erase operations may not substantially affect the ability to promptly read the stored data of a RAID stripe.

16 Claims, 4 Drawing Sheets

(56) References Cited

OTHER PUBLICATIONS

International Search Report and Written Opinion of the International Searching Authority for International Application No. PCT/US2013/049067, dated Oct. 22, 2013, 9 pages.

Auger Collaboration Abraham J. et al.: "Properties and performance of the prototype instrument for the Pierre Auger Observatory", Nuclear Instruments & Methods in Physics Research, Section A: Accelerators, Spectrometers, Detectors, and Associated Equipment, Elsevier BV, North-Holland, Netherlands, vol. 523, No. 1-2, May 1, 2014, pp. 50-95.

European Search Report and Written Opinion for European Application No. 13813635 dated Jan. 8, 2016 (11 pages).

* cited by examiner

SYNCHRONIZATION OF A DISPERSED RAID GROUP

The present application claims priority to U.S. provisional application 61/667,660, filed on Jul. 3, 2012, which is incorporated herein by reference.

TECHNICAL FIELD

The present application may relate to the storage of digital data in a plurality of storage devices.

BACKGROUND

Reliable storage of digital data in a memory system is effected by using error correcting codes, erasure codes, redundant data storage, or the like. One method of storing data in a reliable way is to use a RAID (Reliable Array of Inexpensive Disks) architecture. Except for RAID 0 (which does not provide redundancy), the various RAID types (e.g. 1, 3, 4, 5, 6, etc.) store an extent of data by writing chunks of the data to several independent memories and redundancy data to other independent memories, with the objective that, should one or more of the memories encounter a failure, the data can be recovered from the remaining stored data.

Originally the concept developed using disk drives (mechanical rotating magnetic media platters). A stripe of data comprising a plurality of strips of data may be written, the strips being chunks of data of the extent of data, such that each of the strips of the stripe is written to a separate disk, and a parity strip is computed over the chunks of data and stored to another disk. In this single parity case, the loss of a disk storing a chunk of the extent may be overcome by computing the exclusive-OR of the remaining chunks and the parity data to produce the lost data. This is a simple example of single-parity RAID, but a person of skill in the art would understand the extension to multiple parity, distributed parity, and other similar techniques which may provide protection against the loss of multiple disks.

In many of the RAID mechanizations, considerable effort is expended to reduce the number of disk operations to be performed, as the number of operations per second and the bandwidth of mechanical disk devices is limited primarily by rotational and seek latencies. In particular, the time to assemble the data from all of the strips of a stripe is a significant limitation on the processing speed of a large data base system. Computer technology has far outstripped the ability of the rotating disk to store or retrieve data in a timely manner.

The cost of non-volatile solid state memory has been reduced, primarily due to the increase production of NAND flash devices for use in consumer electronics such as cell phones, tablets, audio players and the like. Memory systems using NAND flash have been produced that emulate the protocols of rotating disks, and such SCSI-compatible devices, for example, are now found in laptops and have been used in arrays to replace mechanical disks in larger storage systems. Flash memory, however, has its own limitations, which may be characterized as being related to timing and wear out.

Data is stored in a flash memory circuit in pages, with a plurality of pages forming a block, and a plurality of blocks being found in a memory circuit ("a chip"). A characteristic of NAND flash memory is that while data may be written in pages in sequential order, the memory cannot be overwritten without being first erased, and the erase operation must be performed on integral blocks. The page read time, page write time and block erase time are not the same time duration, with the write time typically being a multiple of the read time and the block erase time typically being a multiple of the write time. Although these times vary with the specific NAND flash type and manufacturer, an example would be read time (100 us), write time (500 us) and block erase time (5 ms). Moreover, a read operation cannot be performed on a chip when a write or block erase operation is in progress. We do not herein discuss the issue of wear out, or the details of the management of the memory so as to manage the pages of memory where the data has been modified, except to say that this important aspect of a flash memory system is addressed by a which may also include such operations as "garbage collection" and "wear leveling."

If the data of a RAID stripe was written as strips to, for example, separate memory chips, then RAID may be used in a flash memory system. However, if the individual memory chips are operated as independent storage devices, each chip may be in a different state when a request for data from a RAID stripe is received. That is, the chip may be performing, for example, a write or an erase operation and not be available to read data until the write or erase operation has completed. This significant limitation on the performance of a RAIDed flash memory may be overcome by appropriately scheduling the operations of the memory circuits or processing the data received from the memory circuits, such as has been described in U.S. Pat. No. 8,200,887 entitled "Memory Management System and Method, issued Jun. 12, 2012, which is commonly owned, and which is incorporated herein by reference.

For convenience, the technique is termed "erase hiding." This is not intended to exclude an aspect of the technique that may be called "write hiding". As will be seen, the erase hiding and write hiding are both performed in a similar manner, and may often be combined, where the choice of performing a write operation or an erase operation may depend on the nature of the pending operations for any memory chip. In a broader sense, the term "erase hiding" is understood to mean that the operations of the memory system are scheduled or controlled such that there are periods of time where operations that could interfere with low-latency reading of data from the memory system are either inhibited or permitted so as to permit low-latency read operations to be routinely performed. Where such operations are not pending, the particular memory module may also perform read or write operations, some of which may be background operations. Typical operations that may result in increases in latency are erase of flash memory and writing of data. The term "chip" is used to signify a memory circuit having a plurality of blocks of storage locations, or pages, and may include a plurality of memory circuits in a memory package, a plurality of memory packages, and even larger scale assemblies that are operated in a coordinated and consistent manner.

Large flash memory arrays in a single chassis are being produced using these concepts, with scale sizes of 10-40 Terabytes (TB). Even larger scale memory arrays may be assembled from these building blocks. Along with the need for larger and larger memory arrays, with low-latency performance, the reliability requirements that led to RAID are even more stringent today, and the costs of lost data, or the need to perform restoral from a backup are significant to a business.

Today, one may distribute the strips of the data of a RAID stripe over a plurality of modules of memory in chassis, and widely distribute the data over the physical memory space. However, there is a need to protect against the unlikely event of the loss of a full chassis. So, the strips of the data of a RAID stripe may be spread over a plurality of individual chassis, and the chassis may not be located in a same rack or adjacent rack, or facility. Yet, the low latency performance of a memory system using erase hiding is still important.

SUMMARY

A memory storage system is disclosed, having a plurality of memory units, each unit further comprising a plurality of memory modules. A group of memory modules selected from two or more memory units are configured to perform coordinated operations. The memory modules are synchronized using a communications path for transmitting a synchronization signal produced by a synchronization signal generator, and the synchronization signal is distributed to the groups of memory.

In an aspect, a memory unit has a memory module clock to generate a local synchronization signal based upon the synchronization signal received over the communications path and transmit the local synchronization signal to a group memory modules of the memory unit. The memory unit may have an electronic circuit operable to count the cycles of a memory unit clock oscillator and to determine and maintain a duration value of an epoch of time for the unit and an epoch start time for the unit. These maintained quantities may be compared with the received synchronization signal, and the maintained quantities may be adjusted to reduce the difference between the received synchronization signal and the maintained epoch time or the maintained epoch start time. The local synchronization signal may be distributed to the memory modules.

DETAILED DESCRIPTION

Figure 1:
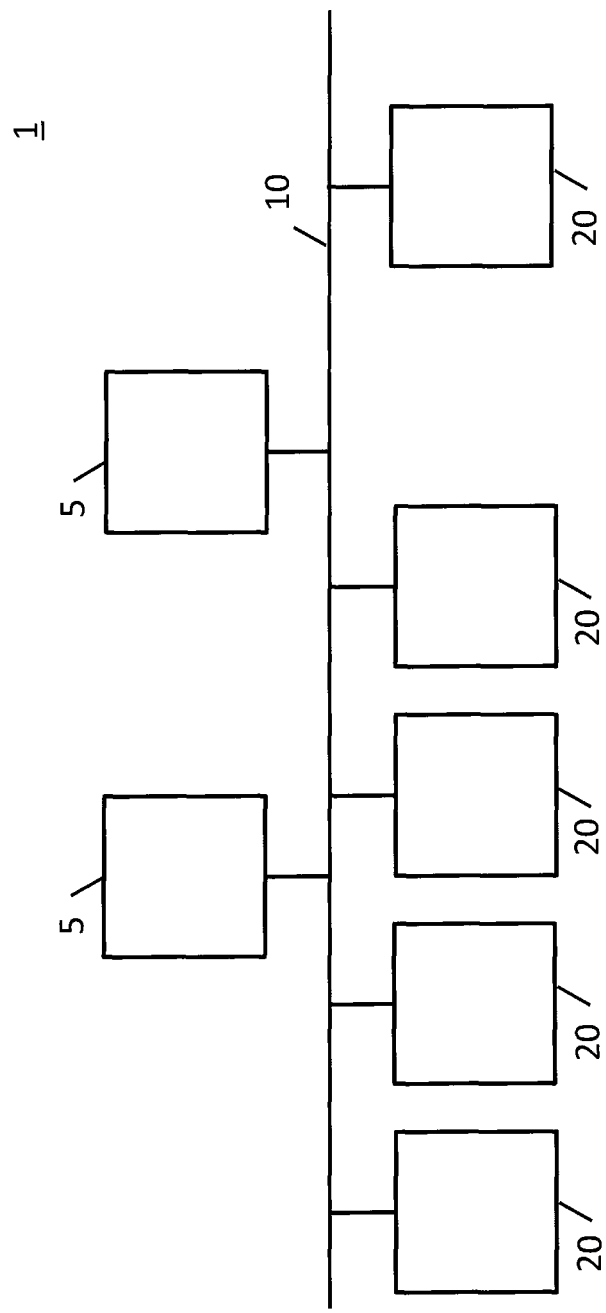
FIG. 1 is a block diagram of a data center.

Exemplary embodiments may be better understood with reference to the drawings, but these embodiments are not intended to be of a limiting nature. Like numbered elements in the same or different drawings perform equivalent functions. Elements may be either numbered or designated by acronyms, or both, and the choice between the representation is made merely for clarity, so that an element designated by a numeral, and the same element designated by an acronym or alphanumeric indicator should not be distinguished on that basis.

When describing a particular example, the example may include a particular feature, structure, or characteristic, but every example may not necessarily include the particular feature, structure or characteristic. This should not be taken as a suggestion or implication that the features, structure or characteristics of two or more examples, or aspects of the examples, should not or could not be combined, except when such a combination is explicitly excluded. When a particular aspect, feature, structure, or characteristic is described in connection with an example, a person skilled in the art may give effect to such feature, structure or characteristic in connection with other examples, whether or not explicitly set forth herein.

It will be appreciated that the methods described and the apparatus shown in the figures may be configured or embodied in machine-executable instructions; e.g., software, hardware, or in a combination of both. The instructions can be used to cause a general-purpose computer, a special-purpose processor, such as a DSP or array processor, an application specific integrated circuit (ASIC), a field programmable gate array (FPGA) or the like, that is programmed with the instructions to perform the operations described. Alternatively, the operations might be performed by specific hardware components (electronic circuits) that contain hardwired logic or firmware instructions for performing the operations described, or may be configured to so, or by any combination of programmed computer components and custom hardware components, which may include analog circuits.

The methods may be provided, at least in part, as a computer program product that may include a machine-readable medium having stored thereon instructions which may be used to program a computer (or other electronic devices), or a FPGA, or the like, to perform the methods. For the purposes of this specification, the terms "machine-readable medium" shall be taken to include any medium that is capable of storing or encoding a sequence of instructions or data for execution by a computing machine or special-purpose hardware and that cause the machine or special purpose hardware to perform any one of the methodologies or functions of the present invention. The term "machine-readable medium" shall accordingly be taken include, but not be limited to, solid-state memories, optical and magnetic disks, magnetic memories, optical memories, or other functional equivalents. The computer program product may be stored or distributed on one medium and transferred or re-stored on another medium for use.

For example, but not by way of limitation, a machine readable medium may include: read-only memory (ROM); random access memory (RAM) of all types (e.g., S-RAM, D-RAM); programmable read only memory (PROM); electronically alterable read only memory (EPROM); magnetic random access memory; magnetic disk storage media; FLASH; or, other memory type that is known or will be developed, and having broadly the same functional characteristics.

Furthermore, it is common in the art to speak of software, in one form or another (e.g., program, procedure, process, application, module, algorithm or logic), as taking an action or causing a result. Such expressions are merely a convenient way of saying that execution of the software by a computer or equivalent device causes the processor of the computer or the equivalent device to perform an action or a produce a result, as is well known by persons skilled in the art.

A memory system may be comprised of a number of functional elements, and terminology may be introduced here so as to assist the reader in better understanding the concepts disclosed herein. However, the use of a specific name with respect to an aspect of the system is not intended to express a limitation on the functions to be performed by that named aspect of the system. Except as specifically mentioned herein, the allocation of the functions to specific hardware or software aspects of the system is intended for convenience in discussion, as a person of skill in the art will appreciate that the actual physical aspects and computational aspects of a system may be arranged in a variety of equivalent ways. In particular, as the progress in the electronic technologies that may be useable for such a system evolves, the sizes of individual components may decrease to the extent that more functions are performed in a particular hardware element of a system, or that the scale size of the system may be increased so as to encompass a plurality of system modules, so as to take advantage of the scalability of the system concept. All of these evolutions are intended to be encompassed by the recitations in the claims.

Other areas of redundant design may include the hardware for routing the data to memory storage modules, power supplies, fans, and the like. Further, it may be desirable for these components to be replaced when necessary without interfering with the operation of the memory system.

A memory system may be configured to operate with one or more associated servers, and such memory systems may be termed "directly attached storage" (DAS). An example of such a system is the Violin Memory 3200 FLASH memory system (available from Violin Memory, Inc, Mt. View, Calif.) which can interface with a server using, for example, a PCIe (PCIexpress) bus having one or more channels. Alternatively, the same memory system may interface with a networked environment in a Storage Area Network (SAN), or as Network Attached Storage (NAS), using a protocol converter, bridge or other technique or device. The connections between the user, the servers and the memory storage may be any of the known or subsequently developed forms of data transport including the worldwide web (WWW, Internet), Ethernet, wide or local area networks (WAN, LAN), optical networks, radio networks, or the like. Dedicated interconnections may also be used.

Large memory systems may service a plurality of individual using applications, and such applications may be independent of each other, as in virtualized systems. Alternatively, a plurality of applications may access and operate on a common memory area, such as where data has been de-duplicated, and is accessed by a plurality of users. The memory system may thus be partitioned, for example, into private (exclusive) memory areas or into shared memory areas, or any combination or variation thereof, a memory location, or range thereof, being subject to configurable access criteria. Depending on the specific needs of an application, the memory areas may be configured so as to have different reliability, access time, bandwidth and other characteristics. These characteristics may be expressed, for example as a selection of the RAID type to be employed, the striping of the data (wide or narrow, for example) and other selectable system attributes, such as the bandwidth of the port through which a server accesses the memory system. These attributes may be embodied in hardware, or configurable by an algorithm, data table, or the like.

Figure 2:
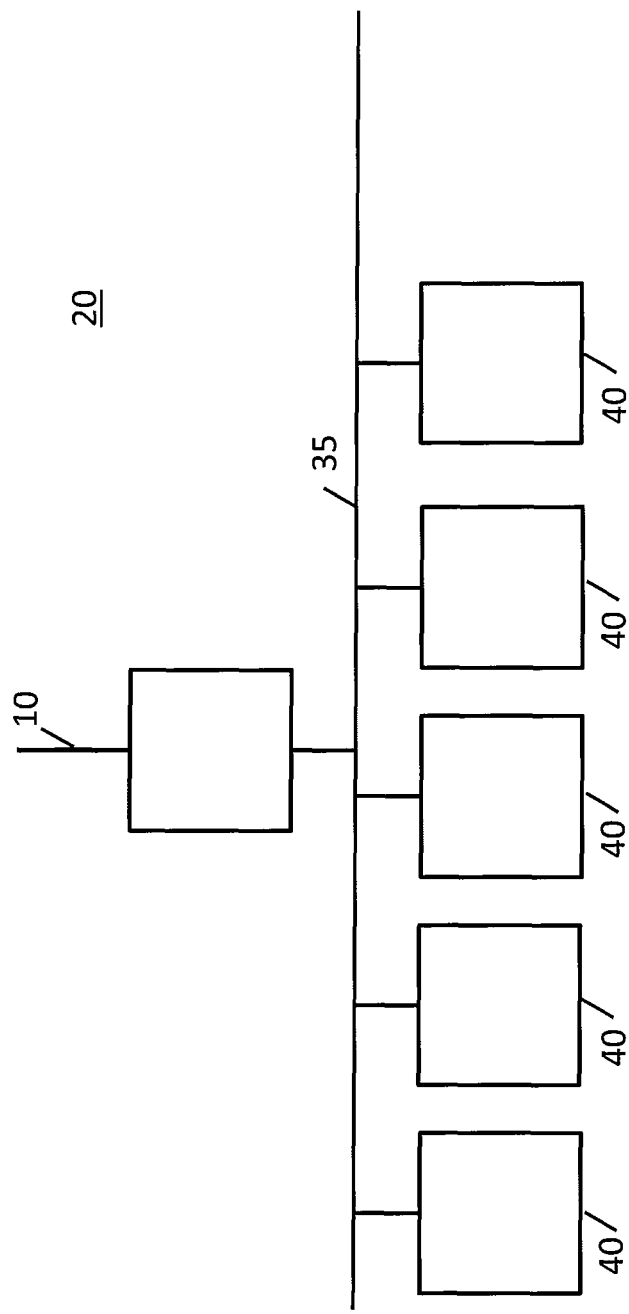
FIG. 2 is a block diagram of a memory unit in the data center of FIG. 1.

FIG. 1 illustrates a generic data center 1 comprising a plurality of large scale memory systems 20 that are accessible through a data network 10, and may receive requests for data or for data to be stored from a plurality of servers 5 or network interfaces (not shown) to the Internet, a wide-area network (WAN), or similar communications system. As shown in FIG. 2, each of the large scale memory systems 20 may be comprised of a RAIDed memory system having a RAID controller 30 and a plurality of memory modules 40 in communication with the RAID controller 30.

Examples of such a memory system may be found in U.S. Ser. No. 11/405,083, entitled "Interconnection System", where memory modules are in communication with a memory controller, which may be a RAID or tree controller, over a branching tree network, or over a star network, a switched fabric of PCIe links, or the like. The RAID controller may allocate strips of a RAID stripe to memory modules 40 in accordance with a protocol. At a basic level, the protocol may allocate the data and the redundancy data such that the failure of any single memory module does not cause a loss of data.

As has been described in U.S. Pat. No. 8,200,887, the characteristics of FLASH memory, for example, include a substantial asymmetry in the time to read data and to write data to the FLASH memory. The write-once-only-before-erase limitation of the NAND FLASH technology also requires occasional erasing of a block of block of the memory, comprising a plurality of pages of data, and the erase operation takes a considerably longer time than that required for an individual write or read operation. Where data is being read from such a FLASH memory, there may be a considerable latency between the read request and the time when sufficient data has been received by the RAID controller so as to return data to the requesting server 5, for example, due to a conflict between the read operations and write or erase operations.

However, when the strips and redundancy data of a RAID stripe are stored in a memory system 20 where the timing of the erase or write operations is appropriately controlled, the excess read latency may be obviated. In the case of a single parity RAID, for example, controlling or scheduling the erase or write operations of the memory modules 40 that are used to store a RAID stripe such that only one of the memory modules 40 of the RAID stripe is performing a write or an erase operation at any time permits the reconstruction of the data of the RAID strip by either reading the actual stored data, or by reading less than all of the actual stored data, but including the redundancy (in this case parity) data, and computing the remaining data using an algorithm (in this case exclusive-OR of the strips and the parity strip). Alternatively, the data set of the two data sets that is first received may be processed so as to return the stored data to a user, resulting in a low-latency read. This approach to managing a memory is termed "erase hiding" or "write hiding.

Figure 3:
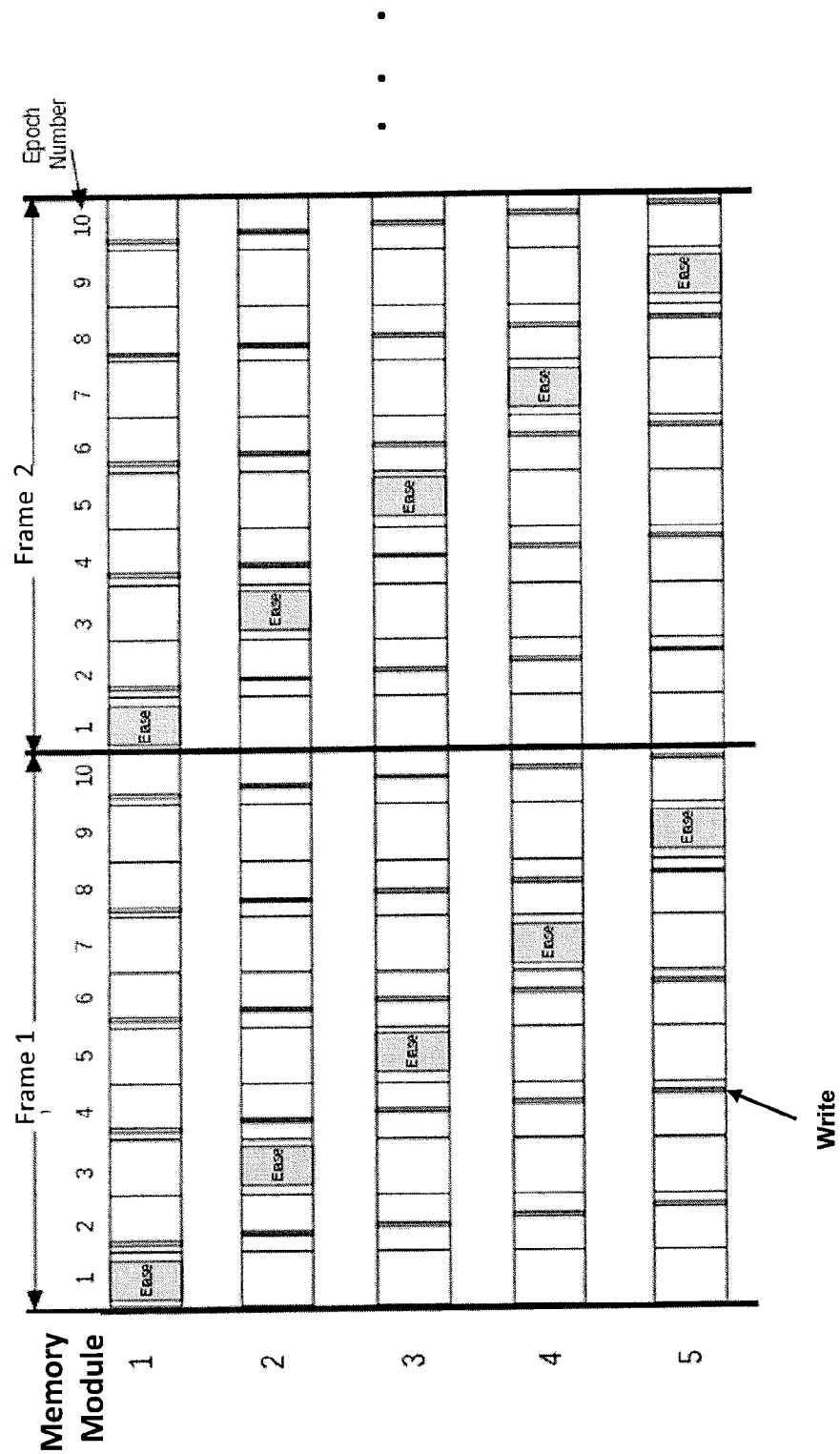
FIG. 3 is an example of a timing diagram for coordinating the operations of memory modules in a memory unit; and, FIG. 4 illustrates the arrangement of an example where the timing of a plurality of memory units is maintained in synchronism with a GPS receiver and the synchronizing signal is distributed over an Ethernet connection.

FIG. 3 shows a timing diagram of five memory modules 40 of a memory system 20, each memory module 40 being associated with a same RAID group. During an epoch of time, a period may be allocated for performing erase operations, and a period of time may be allocated for performing write operations. The constraint may be that no two of the memory modules 40 may be performing an erase or a write operation at the same time. So, a read operation may be performed immediately on all but one of the memory modules 40 of a RAID group. The duration of the period of time during which the erase operation(s) and the write operations(s) are permitted to be performed may be either fixed or variable, providing that the constraint is met. For example, the pending erase operations may result in filling an entire epoch for MM1, but may be completed earlier for MM2, depending on work load of each memory module. Similarly, the amount of time occupied by the write operations may use as much of the allocated epoch as is needed. Moreover, when there are no pending erase operations at a memory module, pending write operations may be performed during the erase period. A person of skill in the art would recognize that these are simple examples, presented so as to explain the concept, but various protocols may be used to manage the memory, including variable epoch times, and dynamic reallocation of processing capability depending on the work load.

In an aspect, modules assigned to a RAID group may be located in a single memory system 20, or distributed over a plurality of memory systems 20.

As an erase time of 5 msec would not be uncommon with existing commercially available components, one might choose an epoch time of about 10 msec, resulting in a frame time of 100 msec. Other time intervals or variable time intervals may be chosen; however, for simplicity of discussion, we will assume a frame time of 100 msec. The term "frame" is convenient to describe a plurality of sequential epochs of a RAID group such that each of the modules of the RAID group has been allocated an epoch where erase (which may also include write) operations may be performed. The frame may also be a plurality of frames.

In the present example, we show a frame of 10 epochs of time, which may be repeated indefinitely (which may represent a 4+1 RAID configuration), which provides both "write" and "erase" hiding. The boundaries between the epochs of time for a plurality of memory modules of a RAID group should remain in the same relationship to each other as shown in FIG. 3. If the frames of different memory modules 40 drift in time with respect to each other, in a relatively short time the erase periods of two or more memory modules will begin to overlap, and the latency performance will degrade. Keeping the memory modules in epoch synchronization may be relatively straightforward within a memory system 20. However, as the scale size of a data center 1 increases to a plurality of memory system 20, maintaining the epoch synchronization is more complex. Even within an individual memory system 20, attention to the maintaining alignment between individual memory modules 40 of the RAID group is needed.

Time may be maintained by counting cycles of an oscillator, where a number of counts equal to that of the oscillator frequency is termed a second. However, the accuracy of this measurement depends of the oscillator having the presumed frequency. Often a 10 MHz oscillator is used and $10^7$ counts represent a second. The accuracy of such oscillators in a system may range from ±50 parts per million (ppm) to several parts per billion (ppb), and may be a function of temperature. If an oscillator having an accuracy of ±50 ppm were used, two circuits using separate oscillators may differ by 100 ppm, and this is 100 usec/s of differential time slippage. Even where highly accurate clocks are used, there is an excessive amount of cumulative time slippage will occur.

Herein, the maintenance of and the measurement of time may be described with reference to an oscillator, a clock, a counter, or the like, however implemented. Each particular approach to measuring time, maintaining a clock or the like may be characterized as having a particular accuracy and precision. So, these terms may be used interchangeably in accordance with conventional practice. The long-term accuracy of the measurement of time may be achieved using Cesium beam and Rubidium clocks, used to control the long term drift of a crystal oscillator, or the like. Indirect methods such as using the inherently highly accurate time base of the global positioning system (GPS) may also be used. GPS-type methods are useful when units are dispersed over a large geographical area, as the same time value is available to all of the units without the need for another time transfer mechanism.

Over a period of a frame (100 msec), the difference in apparent time between two circuits may be 10 usec, and this time is cumulative, so that after 10 seconds, the clocks will differ by 1 msec, which is ten percent of the epoch time. A more accurate clock could be used; however, increased clock accuracy is characterized by increasing part cost, size, and power consumption. In a large memory system, where there may be 50 or more separate oscillators, this can represent a substantial design impact. In some systems a clock frequency is distributed to each of the memory modules 40 of the memory system 20, but this may lead to other design constraints and reliability issues. Whether a distributed clock or multiple clocks are used, the situation is exacerbated when a plurality of memory systems 20 need to be coordinated.

The offset between the apparent time and a baseline time may be expressed as:

$$\delta\tau_{max} = \pm \Delta \cdot T \times 10^{-3} \text{ (usec)}$$

where $\Delta$ is the oscillator error in ppm
and T is the time since the baseline was established in msec.

At present, the operation of a plurality of memory systems 20 in a data center, or portion thereof, are operated as essentially independent memory systems, being interconnected by, for example, an Ethernet, a Fiber Channel, a Infiniband network, or the like 10, with the interaction between each of the memory systems 20 and the remainder of the environment being effected through standard interface protocols, such as iSCSI, TCP/IP, or the like. The internal timing of the operations of the memory systems are isolated from each other and the environment at the time scale of the operation of the interface, which may be substantially greater than the time scale of operations that may be performed within the memory system 20.

RAID, such as described above, may be performed within the domain of a memory system 20, or even a subset of the memory system 20. However, a higher level RAID architecture may be desired so that the failure of a single memory system 20, a rack enclosure having a plurality of memory systems 20, or the like, does not result in the loss of data. That is, strips of a stripe of data may be distributed across a plurality of memory systems 20, with each of the memory systems 20 performing the function of a memory module 40. A system having this architecture and where the operations of a plurality of memory systems 20 (sometimes called a "chassis") are coordinated so that data received by an interface to a memory system 20 may be distributed across a plurality of memory systems 20 for data protection purposes.

However, as has been described above, the memory modules 40 of a single memory system 20 may have time base drifts between them, and this situation extends to each of the memory systems 20 of a plurality of memory systems 20.

A single clock source may be distributed to each of the memory systems 20 so that the same time base is used by each memory system 20, and the same clock frequency may be distributed internally to the memory system 20 so that the same time base is used by each of the memory modules 40. Once initialized, all of the modules of the plurality of memory systems 20 would remain in time synchronism and the start of an epoch and the start of a frame would occur at the same instant of time throughout the system. However, one would appreciate that a system of this complexity will, in due course, experience failures, both hardware and software, wear out of the memory if flash memory is used, or for other reasons require the replacement or reset of a memory module 40. While the clock frequency has not changed (and one would have provided redundant clocks with a fail-over capability), the actual time will have been lost at the memory module being reset or replaced. Resynchronization of the memory module with the remainder of the memory modules 40 within the domain of, for example, a data center, needs to be done.

The precision of synchronization of the start of a frame is related to the duration of the frame and the amount of latency or other overhead associated with lack of complete synchronization. In the example above, where the epoch is 10 msec and the frame is 10 epochs, a cumulative error of ±5 usec would have accumulated, or a peak error of 10 usec. This error is 0.1 percent of the epoch, and allowing such a tolerance would not cause a noticeable degradation of the latency.

So, instead of distributing a clock to all of the memory modules 40, the memory modules 40 may have relatively imprecise computer grade oscillators maintaining a local time and this time may be periodically corrected by receiving a signal from a higher level of the system. When a memory module has been reset or replaced, the synchronization of the epochs and frames may be performed in a time period comparable with the duration of a frame.

At a higher level, memory systems 20 may maintain their own clock and time, and synchronization between memory systems 20 may be performed on a periodic basis, which may be one or more frame durations. In an example, such a period may be 1 second. Since the clock of a memory system 20 may be selected to be more accurate than that of each memory module 40 of the memory system 20, a longer period may be satisfactory. Such synchronization of between memory systems 20 provides for the replacement or reset of an entire memory system without interruption of service.

A 1 second synchronization period is compatible with many pulse sources, including the output from a Global Positioning System (GPS) receiver. The time of each 1 second output pulse bears a known relationship to the global time system (UTC) and would occur at the same instant of time at widely separated sites, obviating the need for transmitting a precision time signal outside of a local domain.

The approach to synchronizing the memory modules 40 within a memory system 20 may be different than that used for synchronizing a plurality of memory systems 20, and depend on the architecture of each, and convenience of various interconnection protocols, including the ability to transmit the synchronization signal over a path that may be shared with other functions, such as data transmission.

As the relative time drift of any of the elements of this system is bounded by the clock frequency error of the level of the system being considered, there is no expectation of large differential time errors (except in the unique case of a reset or hardware replacement). Should such a large time offset have occurred, the latency of the system and the throughput of the system may have suffered, as the "erase hiding" would no longer be effective. Since this is an undesirable result, the selection of oscillators at each level of the system will be chosen so as to avoid the situation in the worst case.

At each memory module 40, for example, the local time base, once synchronized, drifts slowly, $\delta\tau_{max}$, per frame. If a synchronization signal is received once per frame, the maximum expected error is $\delta\tau_{max}$ per frame. So, the local time is within $\delta\tau_{max}$ of being correct with respect to the global time base. The measured error, $\epsilon$, may be used to correct the local time base on a discrete or continuous basis, in accordance with an algorithm.

The details of the synchronization and adjustment algorithm may vary depending on the specific system design. However, an error condition may be considered to exist if the measured error between the time bases exceeds a specified number of standard deviations of the value of the maximum offset error (except, for example, after a reset). So, if the error exceeds a limit, any individual synchronization signal may be, for example, ignored. A plurality of synchronization signals having a closely similar error measurement error, may be taken as representing the global time base.

A characteristic of oscillators is that the signal has a noise spectrum that has a random component and there is also a secular component, the offset $\Delta$, which may be termed the clock bias. The bias changes very slowly as a result of crystal ageing and somewhat more rapidly due to changes in the temperature of operation of the crystal. However, each of the bias terms has a very slow rate of change with respect to a frame time. So, successive offsets between the local time and the global time as measured at a particular memory module 40 are expected to be slowly changing. Each memory module 40, having a different clock module, will have a specific error at any time and may be either positive or negative with respect to the global time.

The allocation of individual epochs at memory module 40 may be accomplished in a number of ways once the basic frame structure is implemented. Each epoch of a frame at a memory module 40 may be allocated to one of an erase interval, one or more write intervals or to read operations. For memory modules 40 comprising a RAID group, whether the group is found in a single memory system 20 or as strips distributed over a plurality of memory systems 20, the erase hiding or write hiding criteria may established such that, for example, no two memory modules 40 in a RAID group are performing a write or erase operation at the same time, in the RAID type is that of a single parity strip. The assignment of a particular frame format to a memory module 40 may be made by a message sent, for example, from the local RAID controller, or by a protocol that depends on the physical location of the memory module 40 in a memory system 20, or some other method to accomplish the same result.

Figure 4:
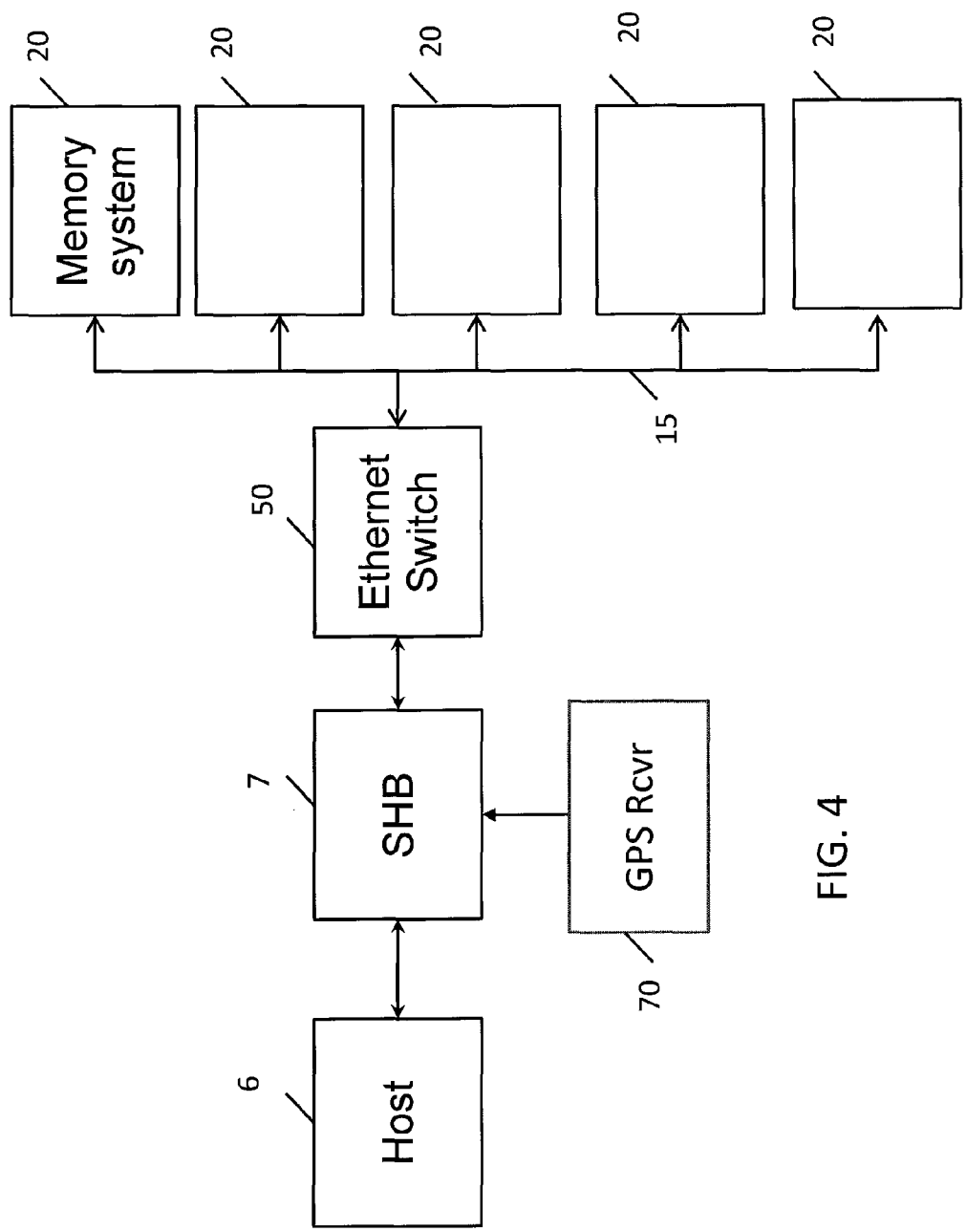

The communications between portions of the data center needed to establish the synchronization may use different protocols at different levels of the architecture. For example, the memory systems 20, which may have, for example, Ethernet interfaces, may be synchronized by using an industry standard protocol such as IEEE 1588. The master for such a system may be a system host board (SHB), which may be further synchronized to a GPS receiver or GPS disciplined oscillator (see FIG. 4). At the individual memory system 20, the synchronization signal may be used to control the frame interval duration and to generate internal messages, pulses or the like so as to communicate the start of a frame to each of the memory modules 40 that may need such signals. The signals may be distributed directly or through the RAID controller 30 or other path, whether in-band or out-of band.

GPS is representative of several orbiting-satellite-related global time systems that are in use or development, including GLONASS, and systems being developed by the European Union and the People's Republic of China. The Internet-based Network Time Protocol (NTP) may also be used.

Alternatively, one of the memory systems 20 of a group of memory systems 20 may act as the master timekeeper and distribute synchronization messages to the other memory systems of the group of memory systems. Where the memory systems 20 are connected by, for example, an Ethernet, provisions can be made for another of the memory systems 20 of the group of memory systems 20 to act as a redundant timekeeper. Moreover such groups of memory systems may communicate with each other so as to maintain epoch synchronization over a larger storage domain.

So, the synchronization of operations may be performed in a hierarchical manner, which may be, for example, a tree-like distribution approach, or a single top-level synchronization module may distribute the synchronization signals directly to a low-level memory module. Intermediate cases are also useful and intended to be within the scope of this disclosure.

At each level in the system, failure cases would be considered, and protection against spurious messages or pulses, or the absence of such pulses would be part of the design. In effect, as the memory modules can operate for a period of time without the regulation described herein, there is not an immediate need to make any significant adjustment in the local time, except during a known reset condition.

One way to do this is at a memory module 40, for example. The memory module 40 has a local crystal and keeps a local time base that was originally synchronized to the next higher level time base in the system. This may have occurred during a reset or initialization event. The local clock and the higher clock will slowly drift with respect to each other in either a positive or a negative time sense, depending on the specific offset bias of each oscillator. Where the $\epsilon$ is positive, the local time is running faster than the higher time; where the $\epsilon$ is negative, the local time is running slower than the higher time. Consequently, the local time should be decreased by $\epsilon$ (taking account of the sign of $\epsilon$) to bring the two clocks into coincidence. This method does not correct the actual clock of the memory module 40, but prevents the time bases from diverging. Since $\epsilon$ is relatively constant over a period of time (the differential bias of the oscillators being very slowly varying as compared with the frame time), the value of $\epsilon$ used Alternatively, the error $\epsilon$ may be used to control the frequency of the oscillator of the memory module. This approach drives the offset to zero and may be a frequency locked loop.

Clock time is kept by counting the number of cycles of an oscillator of a known frequency, and as we have described, an error in the clock frequency results in an error in computing the time, and this error is cumulative. It is also the case that an interval of time, such as an epoch or frame, determined by counting the number of cycles of an oscillator is shorter or longer than the actual time interval depending on whether the oscillator frequency is greater than or less than the expect frequency, respectively.

Accordingly the time would be correct, providing that the number of counts of the clock are used to determine the time interval (e.g., 100 msec, 1 sec) is adjusted by $\epsilon$. Providing that the number of counts is adjusted in this manner, both the time at the local memory module 40 and the duration of the epoch or frame at the local memory module 40 would be the same for all of the memory modules 40. The initial value of $\epsilon$ at each module, and the number of counts used to measure the interval would differ for each module depending of the specific frequency offset between the local oscillator and the higher level oscillator frequency.

Since the sync pulse or command from the higher level of the system defines, for example, an epoch or a frame, adjusting the number of counts of the local clock defining the local epoch or frame, as described above, means that the duration of the local frame is changed so as to closely approximate that of the higher level frame. Thus, the next time that the sync pulse is evaluated against the local frame interval, the value of $\epsilon$ would be essentially zero. That is, the two intervals would be the same. So, the number of local clock pulses that are used to define the local frame would not change from the previous measurement. Over a long period of time, the difference between the local clock and the higher level clock may be expected to change due to ageing of the local clock, temperature changes or other phenomenon known to persons of skill in the art of timekeeping. When these changes occur, the value of $\epsilon$ would deviate from nominally zero, and the number of clock pulses defining an interval at the local memory module 40 would change accordingly.

As the change in clock frequency is slow with respect to the frame time, values of $\epsilon$ are close to zero and one may reduce any jitter in the correction by averaging a plurality of sequential measurements. This may conveniently be done, for example, in an exponential averaging filter so that the changes necessary are applied in a smoothed but timely manner. Where the value of $\epsilon$ is slowly varying, the timekeeping capability of the local memory module 40 is not significantly affected when the time sync process may be interrupted. This might occur when a redundant component is replaced and the source of the clock is changed. Whatever the cause of a missing sync, the time interval error had already been adjusted to nominally zero by the altering of the number of counts in the interval and, at least for some period of time, the error will not significantly cumulate.

Other time intervals in the memory module 40 may also depend on this time and the epoch time may be accurately computed as a percentage of the number of counts in the interval. Moreover, if the overall duration of the epoch time durations of a frame may be set such that the frame completes slightly before the actual frame time, the adjustment of the clock counts may be conveniently performed, and the next frame started on time.

This discussion is intended to indicate that there are a number of methods of maintaining time within a large distributed memory system or data center such that the operation of a RAID group, or other operations that benefit from time synchronization may be effectively coordinated.

While the present example used a frame time of 100 msec as an example, the epoch and frame times may be variable and be controlled using supervisory messages, as the underlying clock times are now coordinated. In an aspect, a plurality of 100 msec frames, for example 10, could be used so that the sync time is 1 second. This may be particularly convenient as global positioning system (GPS) receivers ordinarily provide such pulses synchronized to UCT (Universal Coordinated Time), and a time message defining the exact time, related to the 1 pps signal, so that the actual time of day may be easily distributed throughout a system for various purposes.

Although the present invention has been explained by way of the examples described above, it should be understood to the ordinary skilled person in the art that the invention is not limited to the examples, but rather that various changes or modifications thereof are possible without departing from the spirit of the invention.

What is claimed is:

1. A method of operating a data storage system, the data storage system comprising a plurality of memory units configured to store and retrieve data, each memory unit comprising a plurality of memory modules, the method comprising:
   selecting a RAID group comprising at least one memory module of each of a group of memory units of the plurality of memory units;
   configuring the memory modules of the RAID group to have a frame time having an integral number of epoch times;
   maintaining a synchronization of a start time of the frame time by receiving, at each memory unit, a same periodic signal having a period that is an integral multiple of the epoch time;
   adjusting a time-determining circuit at each of the memory modules so as to minimize a difference between the start time of the frame time at each memory module and the same periodic signal; and
   operating the memory modules of the RAID group such that data previously written to the memory modules of the RAID group is retrieved without delay due to at least one of writing data to or performing an erase operation on the RAID group.

2. A data storage system, comprising:
   a plurality of memory units, each unit further comprising a plurality of memory modules in communication with a unit processor, each memory module further comprising processor and a memory circuit operable to store and retrieve data;
   wherein a group of memory modules from two or more memory units are configured to perform coordinated operations;

an interface at each of the plurality of memory units and a communications path operable to distribute a synchronization signal through the interface; and a synchronization signal generator operable to generate and transmit the synchronization signal over the communications path;

a memory unit clock to generate a local synchronization signal based upon a received synchronization signal and transmit the local synchronization signal to a group of the plurality of memory modules of the memory unit;

a memory module clock in a memory module of the group of the plurality of memory modules; and an electronic circuit operable to:

compare the duration of the maintained epoch time duration or epoch start time with the local synchronization signal received from the memory unit; and adjust the maintained epoch time duration and epoch start time epoch of time so as to reduce the difference between the received local synchronization signal and the maintained epoch time or the maintained epoch start time.

3. The system of claim 2, wherein the synchronization signal generator further comprises a disciplined oscillator.

4. The system of claim 3, wherein the disciplined oscillator uses a global navigation system signal input.

5. The system of claim 4, wherein the global navigation system is a Global Positioning System (GPS).

6. The system of claim 2, wherein a group of memory modules is selected from two or more memory units so as to form a RAID group, epoch start times of the RAID group being synchronized such that the RAID group exhibits at least one of erase hiding or write hiding performance.

7. The system of claim 2, wherein a memory module of the plurality of memory modules is synchronized by the synchronization signal received after a reset of the memory module.

8. The system of claim 2, wherein an Internet-based Network Time Protocol (NTP) is used to control the synchronization signal generator.

9. The system of claim 2, wherein the group of memory modules forms a RAID group.

10. The system of claim 9, wherein the RAID group is configured to perform at least one of erase operations or write operations without interfering with read operations for the RAID group.

11. The system of claim 9, wherein the RAID group is configured to perform erase hiding.

12. The system of claim 2, where synchronization signal is complies with an IEEE 1588 protocol.

13. The storage-system of claim 2, wherein the synchronization signal is one of a GPS (Global Positioning System) received 1 pps (pulse per second) output, or the synchronization signal is derived therefrom.

14. A data storage system, comprising:

a plurality of memory units, each unit further comprising a plurality of memory modules;

wherein memory modules are selected from the plurality of memory units so as to form a RAID group and operations of the memory modules are synchronized such that the RAID group exhibits erase hiding performance;

a synchronization signal from a synchronization signal generator distributed to the memory modules of the RAID group; and each of the memory modules further comprises:

a clock having a clock oscillator; and, an electronic circuit configured to:

count cycles of a clock oscillator and determine a start time of a frame having a frame time comprising an integral number of epochs of time;

compare the start time of the frame with the synchronization signal; and adjust at least one of a frequency of oscillation of the clock oscillator or a number of counts of the clock oscillator in the frame time so as to reduce a difference in time between the synchronization signal and the start time of the frame.

15. A data storage system, comprising:

a plurality of memory units, each unit further comprising a plurality of memory modules, wherein a group of memory modules from two or more memory units are configured to perform coordinated operations;

an interface between each of the plurality of memory units and a communications path operable to distribute a synchronization signal; and a synchronization signal generator operable to generate the synchronization signal for transmission over the communications path;

wherein the synchronization signal is distributed to a group of memory units of the plurality of memory units;

each of the memory modules further comprises:

a clock having a clock oscillator; and, an electronic circuit configured to:

count cycles of a clock oscillator and determine a start time for a frame having a frame time comprising an integral number of epochs of time;

compare the start time of the frame with the synchronization signal; and adjust at least one of a frequency of oscillation of the clock oscillator or a number of counts of the clock oscillator in the frame time so as to reduce a difference in time between the synchronization signal and the start time of the frame.

16. The storage of claim 1, wherein the memory circuit is a NAND FLASH memory circuit.

* * * * *